US005481649A

United States Patent [19]
Birdwell et al.

[11] Patent Number: 5,481,649
[45] Date of Patent: Jan. 2, 1996

[54] METHOD AND APPARATUS USING A DECISION TREE IN AN ADJUNCT SYSTEM COOPERATING WITH ANOTHER PHYSICAL SYSTEM

[75] Inventors: J. Douglas Birdwell; Roger D. Horn, both of Knoxville, Tenn.

[73] Assignee: The University of Tennessee Research Corp., Knoxville, Tenn.

[21] Appl. No.: 28,662

[22] Filed: Mar. 9, 1993

[51] Int. Cl.$^6$ .............................. G06F 15/18; G05B 13/02
[52] U.S. Cl. .................................. 395/75; 395/51; 395/77; 395/904; 395/906; 364/148
[58] Field of Search ................................... 395/75, 77, 51, 395/904, 906; 364/148

[56] References Cited

U.S. PATENT DOCUMENTS

| 4,754,410 | 6/1988 | Leech et al. | 395/51 |
| 5,077,677 | 12/1991 | Murphy et al. | 395/51 |

OTHER PUBLICATIONS

Horn, et al., "Variable Frequency Closed–Loop Discrete Pulse Modulation for Induction Motor Control," Proc. 29th Conf. on Decision and Control, Dec. 1990, 3039–3044.
Birdwell, J. D.; Horn, R. D.; Ilac, J.; Patek, S. D.; Shanmugam, P. S.; "A Variable–Speed Induction Motor Drive Using Expert System Technology", *EPE Firenze*, Published 1991.
Quinlan, J. R.; "Induction of Decision Trees", *Machine Learning* 1:81–106, Published 1986.
Utgoff, Paul E.; "Incremental Induction", *Machine Learning* 4. 161–186, Published 1989.
Sul, Seung K. and Lipo, Thomas A.; "Field–Oriented Control of an Induction Machine in a High Frequency Link Power System", *IEEE Transactions on Power Electronics*, vol. 5, No. 4, 436–445, Published Oct. 1990.
Divan, D. M.; "The Resonant DC Link Converter—A New Concept in Static Power Conversion", *IEEE*. 648–656, Published 1986.

*Primary Examiner*—Robert W. Downs
*Attorney, Agent, or Firm*—Luedeka, Neely & Graham

[57] ABSTRACT

A method and apparatus for use in an adjunct system, such as a control system, operating in cooperation with a linear or non-linear physical system, such as a motor. The physical system performs a function and produces data that are monitored, and attribute values, which may be continuous valued, and system state information are produced from the data. For example, the attributes may include various motor currents and the system state information may include the motor flux. A controller and a decision tree produce decisions and commands to assist the physical system in performing its function. Certain decisions made by the decision tree are identified as being bad decisions, and the decision tree is adapted to produce a decision tree that has improved performance. Preferably, the adaptation method maintains the size of the adapted decision tree within a constant limit during the adaptation, and the adaptation is repetitively performed to successively produce new currently active decision trees.

18 Claims, 8 Drawing Sheets

ORIGINAL DECISION TREE

FIGURE 5

NEW DECISION TREE

METHOD AND APPARATUS USING A DECISION TREE IN AN ADJUNCT SYSTEM COOPERATING WITH ANOTHER PHYSICAL SYSTEM

FIELD OF INVENTION

The present invention is related to adjunct systems, such as control and monitoring systems, for physical systems and is particularly related to decision trees used to monitor and control a physical system.

BACKGROUND OF THE INVENTION

Many physical systems operate in cooperation with an adjunct system. The purpose of the physical system is usually the performance of one or more functions, and the purpose of the adjunct system is to help the physical system perform its functions better. Usually, the adjunct system helps the physical system perform its functions more efficiently or perhaps faster, but it may also prevent the physical system from self-destructing, or help the physical system self-destruct with minimum losses, or simply warn of a condition of the physical system. Two types of adjunct systems are monitoring systems and control systems, both of which are usually implemented electronically at least in part. Both of these adjunct systems may be required to make decisions which improve the physical system's performance. For example, a monitoring system may be required to decide when to indicate the presence of a condition in the physical system, such as sounding an alarm when an electric motor is about to fail. More sophisticated monitoring systems may also decide what physical attributes of the physical system they will monitor and when.

A control system will typically include a system for monitoring the physical system, making decisions, and issuing commands based on those decisions to change the physical system. In such adjunct system, it has been suggested by the current inventors that decision trees might be used to make decisions in the process of monitoring and/or controlling the physical system, but it was recognized that known techniques for implementing decision trees did not work better than conventional control systems. ("A Variable-Speed Induction Motor Drive Using Expert System Technology", J. Douglas Birdwell, Roger D. Horn, et al., European Power Electronics Conference 1991 Proceedings, Firenze, Italy). The system described in the aforementioned paper would operate to control a linear system, which rarely occurs in the real world, but it would not successfully control or monitor non-linear systems that are typically encountered, such as a motor.

SUMMARY OF INVENTION

The method and apparatus of the present invention implements decision trees in adjunct systems for a wide variety of physical systems, which include electric generation, electric motors, wind energy systems, electric and hybrid electric vehicles, and consumer appliances, such as washing machines, refrigerators, dishwashers, air conditioners and dryers, for example. To overcome the above mentioned problems, and others, associated with the use of decision trees in adjunct systems, such as control systems, an embodiment of the present invention provides a method in which decision trees are adapted to changing conditions without causing the decision tree to grow. Known conventional adaptation methods would cause a tree to grow, which in most applications would eventually render the decision tree useless because it would grow too large for its storage device or it will become so large that it requires too much time to make a decision. For example, consider the simple case of an electric motor in a home refrigerator. Such motors typically operate for years without interruption or maintenance. If a decision tree were allowed to grow in a simple refrigerator environment, it would likely become useless for the reasons stated above.

In accordance with the present invention, an improved method is provided for use in an adjunct system. The adjunct system operates in cooperation with a linear or a non-linear physical system that is capable of operating in a plurality of physical system states. The physical system performs at least one function and produces sets of data that include information as to the performance of the function by the physical system. The adjunct system includes a monitor for receiving and monitoring the data of the physical system and a currently active decision tree for making decisions. An adjunct output issues commands in accordance with the decisions. In the method, data are collected, and attributes and system state information are produced therefrom. Certain decisions made by the decision tree are identified as bad decisions based on an evaluation of the collected data. The decision tree is adapted based on the identified bad decisions to produce an adapted decision tree that has improved performance as compared to the currently active decision tree. During the adaptation process, the size of the adapted decision tree is maintained within a constant limit. The adapted decision tree is then used for the currently active decision tree to improve the performance of the adjunct system. The aforementioned steps are repeated to repetitively produce adapted decision trees that are successively used for the currently active decision tree while the size of each successive adapted decision tree is maintained within a constant limit. Thus, the currently active decision tree is constantly updated to improve performance without growing the decision tree beyond a constant limit.

The adjunct system is preferably either a monitor system or a control system for monitoring and/or controlling the physical system. One preferred method of adapting the decision tree includes providing a system reference model and calculating optimal commands based on the collected data, attributes, and system state information using the system reference model. Then, the commands that were actually issued are compared with the calculated optimal commands to identify bad decisions, and attributes associated with the bad decisions are organized into an example. The decision tree is then adapted using, in part, the new example to adapt the decision tree while maintaining the size of the decision tree within a constant size limit.

In one preferred embodiment, an incremental learning adaptation method provides for initially creating a currently active decision tree from examples that include attribute values and decisions. Data are collected from the physical system and attributes and system state information are produced from the data. Using the currently active decision tree and a controller, decisions are made and commands are issued for changing the operation of the physical system in accordance with the decisions. A system reference model is provided and, using the model, optimal commands are calculated for controlling the physical system. The optimal commands are calculated based on the collected data, attribute values and system state information. The optimal commands are compared to the commands that were actually issued based on decisions made by the decision tree, and bad decisions of the decision tree are identified based on the comparisons of the optimal commands and the actually issued commands. When bad decisions are identified, the optimal decision and the attribute values associated with each identified bad decision are organized into a new example. The new example is included within the group of examples, and each new example is associated with at least one node in the currently active decision tree. For each new example, an old example is identified for being removed from the group of examples. The identified example is removed and all of the associations of the identified example are likewise removed. Thus, the steps of including new examples and removing identified examples maintains the number of examples below a constant limit. The currently active decision tree is adapted by incremental adaptation based on the inclusion of new examples and removal of identified examples to produce an adapted decision tree that has a size that is maintained within a constant limit. The adapted decision tree is then used for the currently active decision tree and the aforementioned steps are repeated to repetitively produce adapted decision trees that are successively used for the currently active decision tree.

In accordance with the regeneration method of the present invention, bad decisions are identified and new examples are created in the manner described above. Then, the new example is added to the group of examples, and the same number of examples are removed from the examples. Preferably, conflicting examples and, then, the oldest examples are removed. Then, the decision tree is regenerated from the examples.

Both the incremental adaptation method and the regeneration adaptation method allow the use of continuous valued attribute values. ("Continuous values" are meant to include value sets that may be embedded in the real number system with the standard order.) In one embodiment, continuous valued attribute values are used in an incremental adaptation method as described above, except the step of removing examples is not included in the method. Also, the invention includes a control system having a monitor, a currently active decision tree, a controller, and a processing system that operates in accordance with the methods described above.

The decision tree may be implemented in a wide variety of devices. For complex systems, the decision tree is preferably implemented in a computer. For less complex systems, or systems requiring inexpensive control or monitoring, the decision tree is preferably implemented in a logic device such as a programmable gate array, that offers speed of operation and yet is relatively inexpensive.

BRIEF DESCRIPTION OF THE DRAWINGS

The present invention may best be understood by reference to the following Detailed Description of preferred embodiments of the invention when considered in conjunction with the Drawings in which.

DETAILED DESCRIPTION OF THE DRAWINGS

Figure 1:
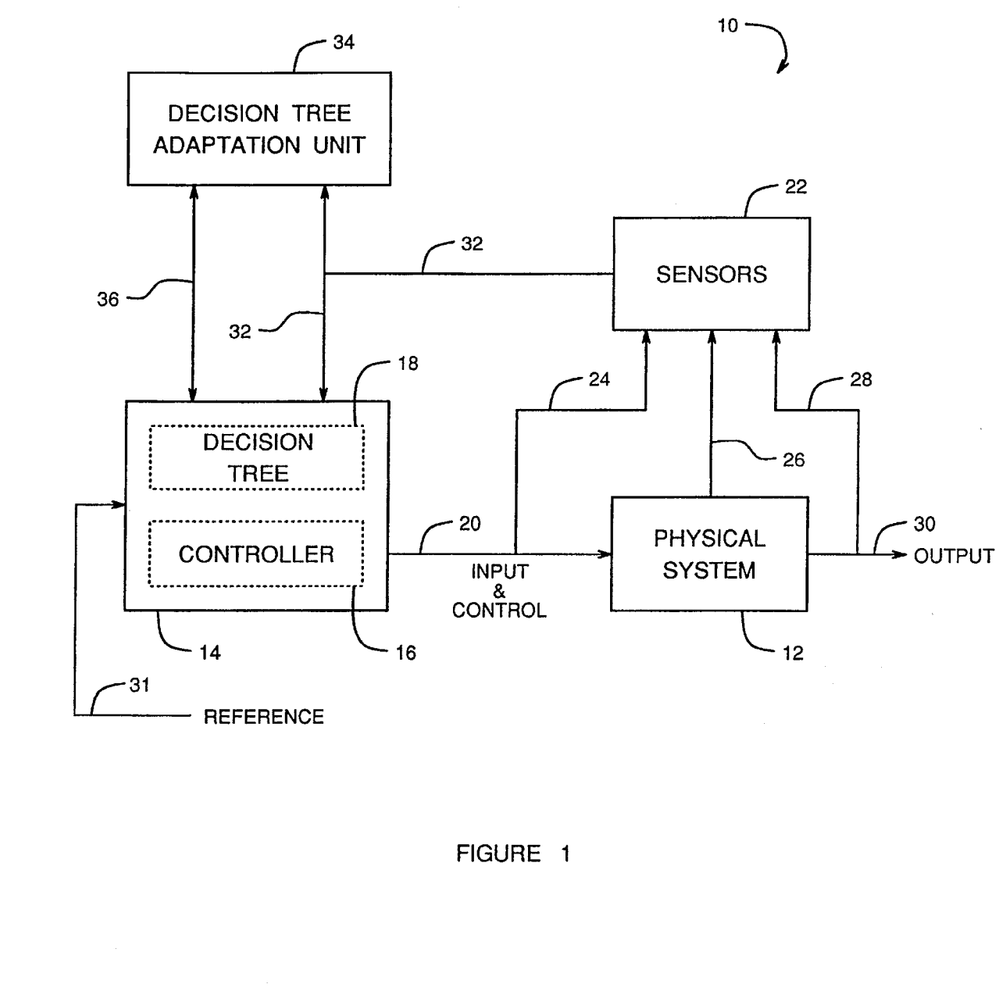
FIG. 1 is a diagram of a physical system being controlled by a decision tree controller in which the decision tree is adapted by a decision tree adaptation unit.

Referring now to the drawings in which like reference characters designate like or corresponding parts throughout the several views, there is shown in FIG. 1 a system diagram 10 illustrating a physical system 12 under the control of a decision tree controller 14. The physical system 12 is a representation of a physical apparatus or a process that has one or more inputs and outputs and is subject to being controlled. Thus, it may represent a machine, a series of machines, a plant or an electrical circuit. While the present invention would have a wide variety of applications, it is particularly suited to the control of a physical system that represents an electrical inductive load, such as a motor.

The decision tree controller 14 includes both a controller 16 and a decision tree 18 that are separated by dashed lines in the Figure to illustrate that the decision tree 18 may be part of the controller 16, or it may be separate from the controller. For present purposes, reference to the decision tree controller 14 shall be understood to refer to both the controller 16 and the decision tree 18. The decision tree controller 14 produces commands that constitute input signals and control signals to the physical system 12 that are applied on lines 20 and the physical system 12 responds to the input and control signals to produce an output on line 30. Data sensors 22 are connected by lines 24 to lines 20 to sense input signals and control signals, by lines 26 to directly sense data of the physical system 12 that are not associated with either its input or its output, and by lines 28 to the output lines 30 for sensing data associated with the outputs of the physical system 12. The data sensed by the sensors 22 may include mechanical quantities, such as the rotational speed of a shaft or measured acceleration in a specific direction of a part of the physical system 12. They also include electrical values such as current, voltage, phase information, etc. Information normally obtained through lines 26 would include such data as temperature, vibration, electromagnetic radiation, or other physical values that are not associated with either the input or the output of the physical system 12.

The physical system 12 should be understood to represent both linear and non-linear systems, but it will be recognized that most actual physical systems have highly non-linear relationships between outputs and all of the parameters that affect its output.

The data that are sensed by the sensors 22 are transmitted by lines 32 to the currently active decision tree 18 and to the decision tree adaptation unit 34 and the decision tree 18 uses some of the data, and the reference transmitted by lines 31, as attributes, which will be understood to mean, as used herein, any and all variables that the decision tree 18 uses to make decisions. In addition to the lines 32, lines 36 extend between the adaption unit 34 and the decision tree controller 14 to provide bi-directional communication. The decision tree 18 is on-line and performs an on-line function. It responds to the attributes appearing on lines 32, and generated by controller 16, and makes a decision. The controller 16 then issues input signals and control signals through line 20 based on the decisions of the currently active decision tree 18.

The controller 16 may be in any generally accepted form as is taught in the literature of control systems in electrical engineering, and may be continuous time, discrete-time, or a combination, possibly with multiple sampling rates. For example, in continuous time a generally accepted form of a controller 16 is a vector of ordinary differential equations, f, and a vector-valued function, g, $$\frac{dx}{dt}(t) = f(x(t),y(t),t)$$

$$u(t) = g(x(t),y(t),t)$$

where x, u, and y are vector-valued functions of time, x(t) is the value of the controller's internal state, or memory, at time t, y(t) is the vector of measurements or attributes available to the controller 16 at time t, and u(t) is the controller's vector-valued output at time t.

A decision tree 18 extends the functionality of a controller 16 by providing an implementation of a discrete-valued function h of the instantaneous values of x, y and u, as a function of time. Mathematically, the decision tree 18 can be expressed as $$v(t_k) = h(x(t_k), y(t_k), u(t_k), t_k)$$

where the possible values of $v(t_k)$ are in a discrete and finite set, and the decision tree 18 is evaluated at discrete instants of time $t_k$, for k an integer.

The output of the controller 16 and decision tree 18 is derived from the two vectors u(t) and $v(t_k)$, where v(t) for times t such that $t_k \leq t < t_{k+1}$ is constant and equal to $v(t_k)$. This can be expressed mathematically as $$w(t) = m(u(t), v(t))$$

where w is the vector-valued output of the decision tree controller 14 on line 20 of FIG. 1.

The function h is implemented by a decision tree 18 which may be discovered by machine learning which examines examples of desired operation in an initial training set. The function h is modified during operation of the system described by the diagram 10 by adaptation of the decision tree 18 using collected examples of poor operation and a preferred method of incremental learning.

Preferably, the decision tree 18 is initially constructed based upon an initial training set comprising at least a number of control inputs and subsets of attribute values that are associated with each control input. This initial training set may be derived mathematically by solution of an optimization problem or simulation of a system reference model, or it may be derived by observation of the system operating in cooperation with another adjunct system. Based on such an initial training set, a decision tree is calculated, preferably by a conventional computer program performing an inductive inference method published by J. R. Quinlan. For example, see *Machine Learning,* Vol. 1, pp. 81–106, by Quinlan, J. R. (1987). The decision tree, thus calculated, would have a plurality of nodes representing points at which decisions are made. After a decision is made at a particular node, the program is directed by that decision to a descendant node in the decision tree, and another decision is made. The program continues to move through the nodes until a terminating node in the tree is reached at which point a conclusion is reached.

At some time during operation the adaptation unit 34 may identify a decision as a bad decision. A decision may be labeled bad by detection of a variance between the control command that was issued and the predicted optimal command calculated by the adaptation unit 34 based on the system reference model of the physical system 12. As used wherein, "optimal" is used in a broad sense and, for example, an "optimal command" would mean any command that is expected to improve performance or provide the best performance. A decision may also be labeled bad by the result of evaluation of a decision tree used to monitor system performance. See, for example, "A Variable-Speed Induction Motor Drive Using Expert System Technology", J. Douglas Birdwell, Roger D. Horn, et al., European Power Electronics Conference 1991 Proceedings, Firenze, Italy. When a bad decision is detected, the adaptation unit 34 begins a process of modifying the currently active decision tree 18. In the preferred embodiment, the attributes (data) on line 32 are also provided to the decision tree adaptation unit 34 which is operating off-line. The decision tree adaptation unit 34 includes within it a system reference model of the physical system 12 that is used to calculate optimal responses of the controller 14 based on the received or calculated attributes. For example, when the adaptation unit 34 receives attributes from the sensors 22, it calculates the optimal input signals and control signals that should be applied to the physical system 12 in order to achieve predetermined desired results. The optimal responses are combined with the attributes that were actually sensed by the attribute sensors 22 to form a new example, or training subset, for use in modifying the decision tree. In the preferred embodiment, a plurality of new examples, such as about 20 to 100 examples, are accumulated and stored, and then the method of adapting the decision tree begins. Also in the preferred embodiment, the system reference model is modified or updated to more accurately predict the behavior of the physical system by observing its behavior during operation and changing the model to more accurately represent the physical system. Such methods for identifying a system reference model to a physical system are well known.

One important feature of the present invention is a method for adapting or modifying the decision tree while not growing the tree beyond a constant limit. In one method, the regeneration method, of the present invention, this adaptation is achieved by storing a number of new training examples based on the optimal control inputs and the associated attributes that are discussed above. The new examples are then appended to the initial training set, and the same number of examples are removed from the training set. In this method, the training set stays the same size. Then a new decision tree is calculated using the same method, the Quinlan inductive inference method, that was used to generate the initial decision tree. The new decision tree is then substituted for the currently active decision tree and, thus, becomes the currently active decision tree. Since the training set remains the same size, it will be appreciated that the size of the decision tree will also stay about the same, but the tree will vary in size since different training sets will produce decision trees of different sizes even though the two training sets are the same size. While it is conceptually easier to understand substitution of a new decision tree for the currently active decision tree, an alternate procedure which modifies a copy of the currently active decision tree to achieve the same tree as achieved by the aforementioned substitution is preferred.

In an alternate method, the incremental adaption method, of the present invention, the decision tree is again adapted without allowing the tree to grow beyond a constant limit. In this incremental adaptation method, the initial decision tree is first created using a modified Quinlan inductive inference method, in which examples of the initial training set are associated with each node of the tree as discussed in more detail below. When bad decisions are identified, nodes are identified in the decision tree that are associated with the bad decision. A number of new examples are produced as described above and are included with the examples, and the same number of examples are removed from the examples. In the preferred method, examples associated with the identified nodes are first checked for conflicting examples, which are examples having the same attributes and a different decision. An old example that conflicts with a new example is replaced with the new example. Then, the remaining new examples replace the oldest examples associated with each identified node. As examples are added and removed, associations of the examples with the nodes are also added and removed, respectively. By this method the number of examples associated with all nodes remains below a constant limit. After the samples are appended and removed from each affected node in the manner described above, the decision tree is incrementally adapted (modified) using a modified Utgoff method. In general, the incremental adaptation method described above is more efficient (faster) than the first described technique for adapting the decision tree and is therefore preferred.

The decision tree adaptation unit 34 calculates the new decision tree in accordance with the present invention without increasing the size of the decision tree beyond a constant limit. For any particular physical system 12 and adaptation unit, the maximum size of the tree will be the worst case scenario using either the incremental adaptation method or the regeneration method given a constant known size of the training set. This important feature of the method of the present invention recognizes the capability of a decision tree adaptation unit to quickly increase the size of the decision tree until it is no longer practical or operable for one of several reasons. For example, a growing decision tree could quickly become too large for storage in either the decision tree controller 14 or the adaptation unit 34. Also, as a decision tree grows, it takes longer to make decisions. Thus, as a decision tree grows, the length of its decision making time may become so long that it is incapable of making decisions fast enough to implement on-line decisions in the physical system 12.

Utgoff's above discussed method is described in "Incremental Induction Of Decision Trees" by P. E. Utgoff published in *Machine Learning*, Vol. 4, pp 161–186, 1989. The incremental adaptation methods of the present invention are similar to Utgoff's method, except that Utgoff's method may allow trees to grow indefinitely, whereas the method of the present invention limits growth to a constant limit. Also, Utgoff's method works with discrete valued example attributes and, in the preferred embodiment, the decision tree adaptation method uses continuous valued example attributes.

Utgoff's method is limited to problems involving discrete valued attributes. To extend Utgoff's method to allow the inclusion of continuous valued attributes, two modifications are used. First, lists of examples are associated with nodes, as opposed to Utgoff's method which keeps counts of attribute values associated with nodes. Second, the problem of handling continuous valued attributes is converted to a problem containing only discrete valued attributes and finite discrete sets of comparisons. Each of these sets can be treated as the values of a new discrete attribute.

Specifically, note that a continuous attribute is represented in any set of training examples by a finite number of distinct values. Utgoff's method selects the optimal test to be performed on an attribute's value for a decision node using discrete counts while our method selects the optimal test using a search over a finite number of tests. Thus, optimal selection of a test to be used at a decision node reduces to a search that includes a finite number of tests which are comparisons of the continuous attribute against constant values. This method can be applied to any finite number of continuous attributes. The result is the reduction of the incremental learning process for continuous attributes to a form that an extended version of Utgoff's method can handle. That is, the search over tests which include finite sets of comparisons is a discrete attribute problem that Utgoff's method, extended by representing sample sets associated with nodes of the decision tree as lists, can handle.

The adaptation process operates in an off-line mode and decisions must be made as to when the adaptation will occur and what information will be used to implement adaptation. One method for making this decision is to take "snap-shots" of the physical system attributes at arbitrary times, operate on the data and adapt the decision tree. This process will work well in most applications, but to improve performance, one may use a decision tree to observe the data (attributes) and make a decision as to when data (attributes) will be taken for the purpose of adaptation.

In summary, three important features of the present invention are (1) adaptation of decision trees without growth beyond a constant limit, (2) incremental adaptation of the decision tree that provides faster adaptation times as compared to the regeneration method, and (3) given the same training set and the same set of attribute values, a decision tree produced by the regeneration method and a decision tree produced by the incremental adaptation method will produce the same decision.

A significant advantage achieved by the present invention is an automatic design of adaptive modulation methods from examples which originate with simulation or optimization of modeled behavior. As complexity increases, measured by the number of power electronic devices, or by the required process behavior (as with regenerative electric braking and energy storage for electric vehicles), other approaches become intractable.

Figure 2:
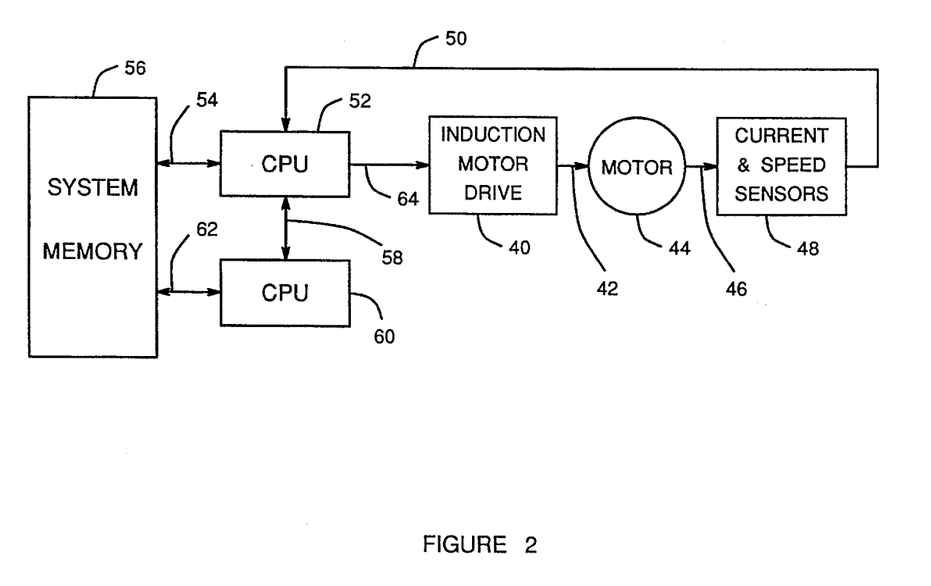
FIG. 2 is a diagram of a motor and an adaptive control system.

Referring now to FIG. 2, there is shown an induction motor drive 40 that applies currents through lines 42 to an induction motor 44 whose output attributes are applied through lines 46 to sensors 48 that sense motor current and speed in the preferred embodiment. For example, the induction motor drive 40 may be a resonant DC link controller drive. It will be understood, however, that the invention may be applied to other devices such as the various other types of converters, including cycloconverters, converters which allow two-way power flow, and converters without or with other energy storage configurations. The sensed attributes are then applied from sensors 48 through line 50 to a CPU 52 that communicates through lines 54 with a system memory 56 and communicates through lines 58 with a CPU 60. The CPU 60 communicates through lines 62 with the system memory 56 and also communicates with the CPU 52 through lines 58.

In this particular apparatus, the currently active decision tree would be implemented by CPU 52, and the tree data, including the training set used to create the decision tree, are stored in the system memory 56. As attributes are received through lines 50, the CPU 52 makes decisions in accordance with the currently active decision tree, and the decisions are output in the form of commands on lines 64 that control the induction motor drive 40 which, in turn, applies the desired currents to the motor 44. A decision tree in this configuration is called a decision tree modulator because its purpose is to modulate, or vary under control, the input motor currents and thereby control physical attributes of the motor, such as shaft speed and torque. In the preferred embodiment, when the induction motor drive 40 is a resonant link converter, the attributes sensed by the sensors 48 are motor currents at two phases and the speed of the motor. If desired, other information such as voltages, phase angles and the like could also be sensed and used as attributes on line 50. The initial or starting decision tree is created using a training set that comprises attributes sensed by the sensors 48 as the motor is ramped from zero speed to full forward speed to full reverse speed and back to zero. This initial training set may be acquired physically or by simulation, and the initial decision tree is created from the training set using the Quinlan inductive inference method. The attributes on line 50 are also received and acted upon by CPU 60. While CPU 52 is primarily functioning to provide on-line control of the induction motor drive 40, CPU 60 is primarily functioning to provide off-line calculation for the purpose of adapting the decision tree to present operating conditions.

The system memory 56 is loaded with a system reference model and a cost function regulator (CFR) which is discussed in "Field-Oriented Control Of An Induction Machine In A High Frequency Link Power System" *IEEE Trans on Power Electronics*, pp. 436–445, Vol. 5, No. 4, October 1990, Sul, S. K. and T. A. Lipo. The cost function regulator (CFR) is a DPM (discrete pulse modulation) modulator that generates an optimum switching sequence for an induction motor drive, such as a resonant DC link converter, for a specific performance measure. Although the CFR cannot be implemented in a real time system, it is useful because it exhibits optimal performance and can be employed as a benchmark used to generate data for an inductive inference training set. The modulator operates by performing an exhaustive search of all possible switching commands (there are 7 distinct commands for the standard 3 phase inverter) for a particular set of attributes and selecting the command that minimizes a given cost function (most nearly achieves a desired result). Also, the CFR's system reference model is updated or identified with the actual operation of the DC link converter and motor so that it more accurately represents this physical system. Such updating or identifying of models is well known and conventional methods are used to accomplish this identifying function. Of course, if the model is well chosen initially, it is not necessary to update (identify) the system reference model with the physical system.

In accordance with this embodiment, the CPU 60 first identifies a bad decision by the decision tree implemented by CPU 52. The machine learning adaptation method of this embodiment uses a model reference strategy similar to that previously described with reference to FIG. 1. The decision tree modulator of CPU 52 and the induction motor drive 40 operate in a real time on-line environment. The adaption method performed by CPU 60 runs in an off-line environment, and an adaption cycle begins with the collection of system operation data. The data and externally provided reference information are used to generate attribute values (for example, motor speed, motor currents for two phases, and motor error currents for two phases) that are supplied to the decision tree modulator of CPU 52 and inverter commands that are produced by the decision tree modulator of CPU 52. Collected data are also used to produce system state information (motor flux, for example) that is associated with each set of attribute values and inverter commands. As used herein, system state information is a set of variables whose values uniquely specify the effect of past inputs and past behavior on future system behavior given future input. For example in the case of a motor, system state information may include the following: shaft rotational speed, input currents, and magnetic flux.

The next step in the adaptation process is the generation of optimal inverter commands for comparison with the inverter commands produced by the currently active decision tree of CPU 52. Optimal commands are calculated using a system reference model of motor 44 and induction drive 40 and the CFR modulator. The decision tree modulator commands that differ from the CFR modulator commands (for the same sensor attribute values) are identified as bad decisions. These incorrect commands are extracted from the data stream, and the attribute values that are associated with the incorrect commands are put into the format of a training set example. Thus, the new example includes the sensed attribute values and the optimal inverter command (switching command) that was determined by the CFR modulator and the system reference model. Before adapting the decision tree, the CPU preferably creates a number of new training examples, which will normally number on the order of about 20 to 100 examples.

After the new training examples are collected and placed into the format of the training set, the new examples are used to calculate a new decision tree using either of the two methods described above. In the case of the incremental adaptation method, the CPU 60 has already associated examples from the previous training set with the nodes of the decision tree and, based on those associations and using the modified Utgoff method, the CPU 60 associates a bad decision with one or more nodes in the decision tree. For each node associated with any new example, new training examples are associated with the node and the same number of the examples, preferably the conflicting examples and the oldest examples, are removed from examples associated with particular nodes. In this particular embodiment, each example comprises an optimal inverter command (which was calculated with the model and CFR modulator), the motor speed, the motor current for two phases, and the error current for two phases. As used herein, "example" refers to the values of the attributes and one or more decision variables at a given time. The new examples are appended, and the old examples are removed, in accordance with the modified Utgoff method, the incremental adaptation method, described above. Then, the new decision tree is switched in as the currently active decision tree used by CPU 52 to make decisions affecting the commands issued to the induction motor drive 44.

The regeneration method for generating the new decision tree is less efficient than the incremental adaptation method, but in some ways it may be considered easier to implement. The following is a pseudo code listing for the regeneration decision tree adaptation routine as applied to this particular embodiment.

REPEAT
Collect system measurements, DT modulator input and output.
FOR i=1 to num. of measurements Estimate system state values from measurement.

Figure 8:
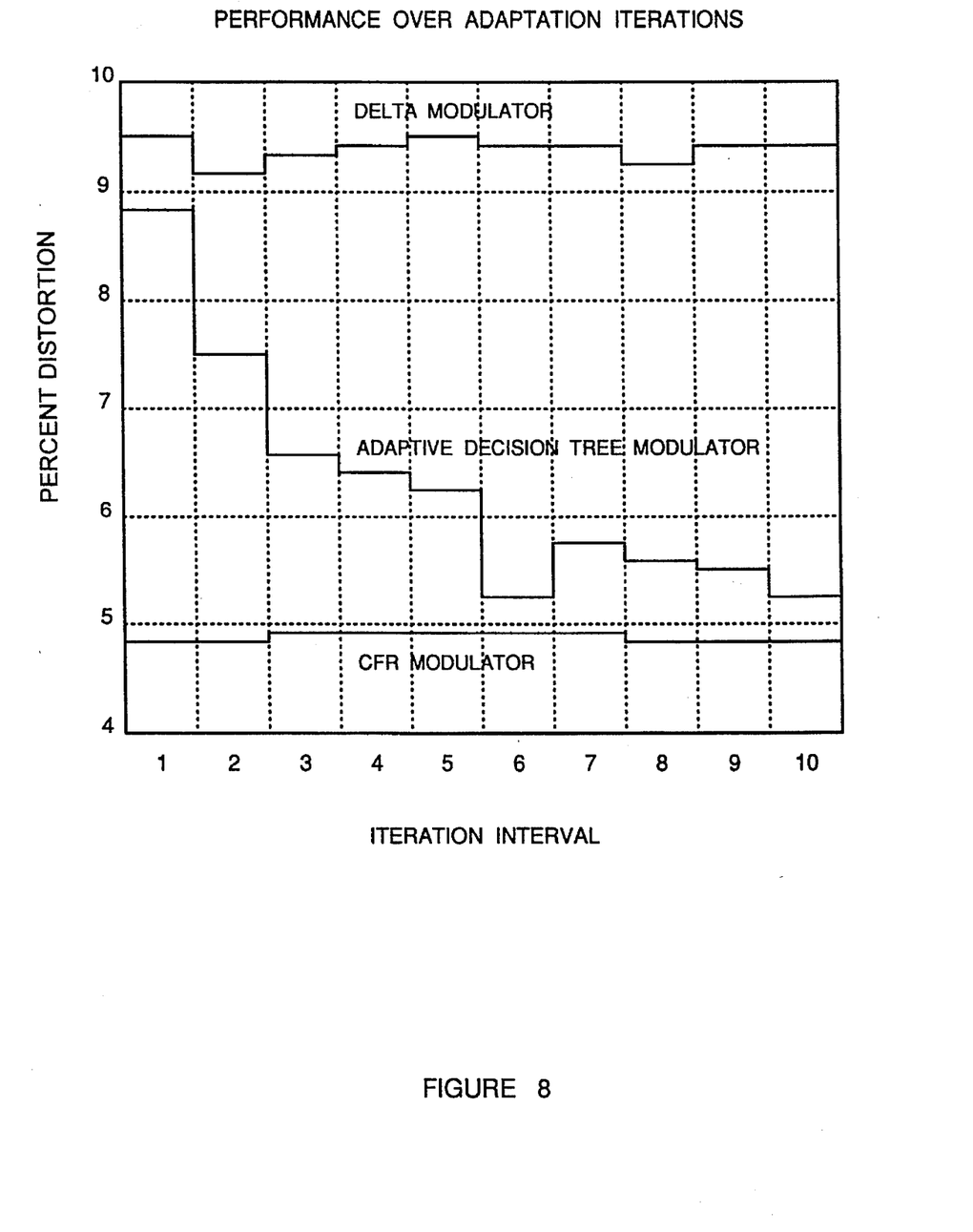
FIG. 8 is a graph illustrating calculated optimal performance in controlling a DC resonant link converter and motor, performance of a delta modulator, and performance of an adaptive decision tree modulator.

FOR k=1 to num. of inverter switching commands
    Calculate next state using system reference model and command k.
    $J_k$=performance measure for command k
End of FOR
Select optimal inverter command (minimum $J_k$).
IF DT modulator output≠optimal command THEN
    Make new example for training set with: Class= optimal command Attribute list=DT modulator input
    Replace conflicting or oldest example in training set with new example.
End of IF
End of FOR
Generate new decision tree with inference algorithm.
Replace old decision tree in modulator with new tree.
UNTIL Stopping event received The learning methods described above are key to achieving improved performance using a decision tree modulator as compared to other conventional modulators. For example, controlling a resonant link converter with a current regulated Delta modulator achieves average current distortions of between 9 and 10%. According to the CFR modulator and model, optimal average current distortions would be about 5%. Using the adaptive methods of the present invention and a decision tree modulator as described above, average current distortion will be between about 5 and 6% and, thus, approach the optimal. FIG. 8 is a graph illustrating the performance of a Delta modulator and the adaptive methods of the present invention and comparing those two performances of the optimal performance that is calculated using the CFR modulator.

Figure 3:
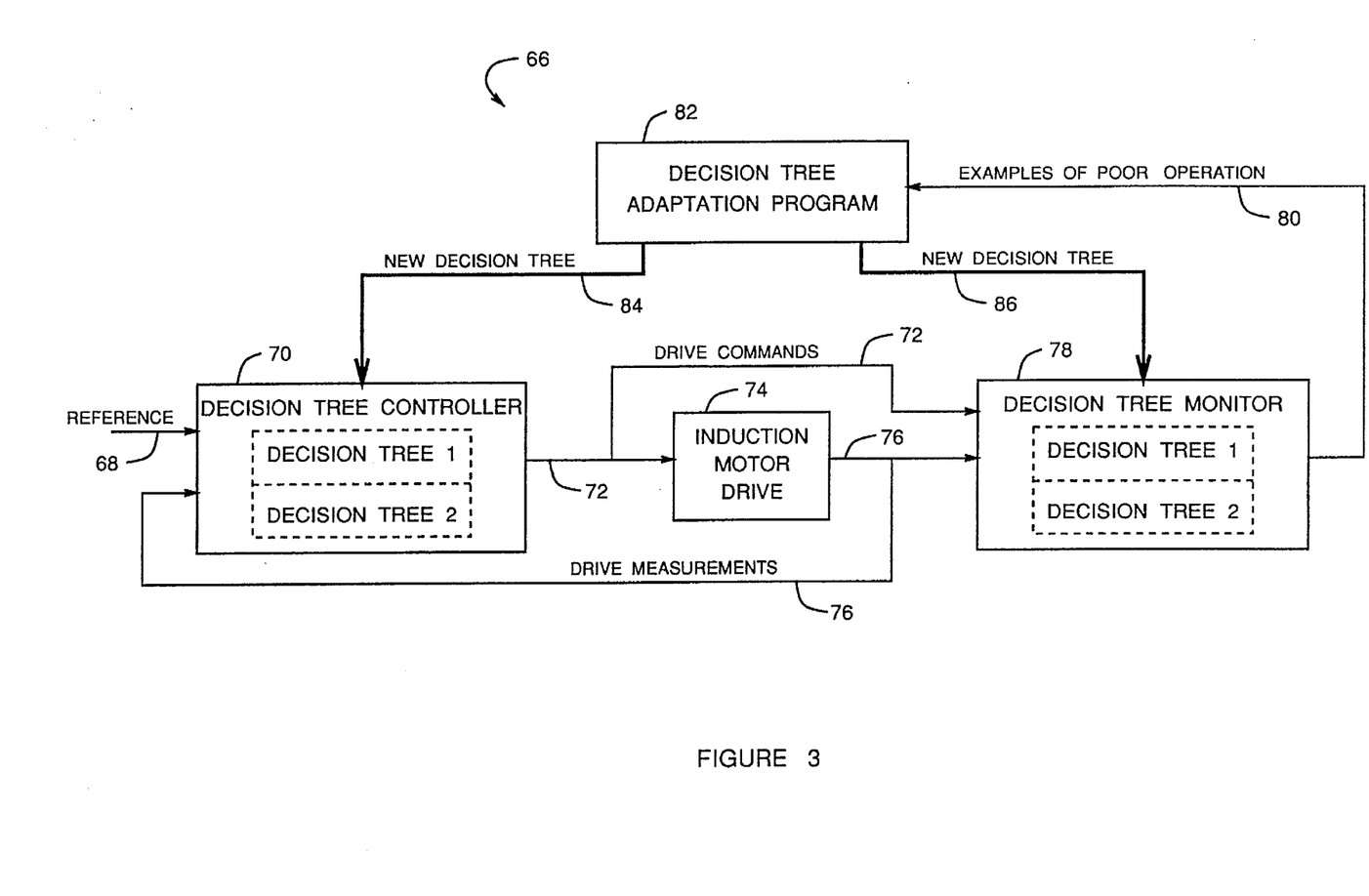
FIG. 3 is a diagram of an induction motor drive system being monitored by a decision tree monitor and being controlled by a decision tree controller in which the decision trees are adapted.

Referring now to FIG. 3, there is shown another decision tree apparatus 66 in which the method of the present invention may be practiced. In apparatus 66, a reference signal is applied through lines 68 to a decision tree controller 70 whose output commands are issued through lines 72 to an induction motor drive 74 which may be, for example, a resonant DC link inverter. The drive commands from the controller 70 are also applied through lines 72 to a decision tree monitor 78. The output of the induction motor drive is also applied through lines 76 to the decision tree monitor 78, and lines 76 feed the output of the drive 74 back to the decision tree controller 70. The output of the decision tree monitor 78 is applied through lines 80 to a decision tree adaptation program unit 82 that operates to adapt the decision trees of the controller 70 and the monitor 78 to changing operating conditions. New decision trees are transmitted through lines 84 to the controller 70 and through lines 86 to the monitor 78.

In operation, the decision tree controller 70 operates in a manner similar to the controller represented by CPU 52 and system memory 56 shown in FIG. 2. That is, the controller 70 monitors attributes of the induction motor drive 74 and issues inverter commands or drive commands through line 72 in accordance with decisions made by its decision tree. In the controller 70, two decision trees are provided. One of these trees constitutes the currently active decision tree that is making decisions and causing commands to be issued on lines 72. The second decision tree is the adapted decision tree created by the decision tree adaptation program 82. Once the new adapted decision tree is loaded into the controller 70, the new decision tree is switched in as the currently active decision tree, and the old decision tree will be replaced by a new one. In this manner, the decision tree controller 70 switches back and forth between two trees and the inactive tree is continuously being updated or adapted by the decision tree program 82.

The decision tree monitor 78 represents the major difference between the apparatus of FIG. 2 and FIG. 3. In the apparatus of FIG. 2, the decisions as to when and how a decision tree should be adapted were based upon attributes that were fixed. Basically, there were no decisions made as to which attributes should be observed when making decisions about adapting a decision tree. Likewise, a relatively simple test was utilized to determine whether a decision was good or bad. In the embodiment shown in FIG. 3, a decision tree monitor is used so that a large number of attributes of the induction motor 74 may be monitored and used in making decisions as to when and how the decision tree adaption program should change the decision trees in the controller or in the monitor 78. Thus, in the apparatus 66, the decision tree monitor 78 is used to make decisions as to examples of poor operation that are fed to the decision tree adaptation program and, in response to these examples, new decision trees are created by the methods previously described. Apparatus 66 illustrates that the adaptation methods of the present invention may be used in a wide variety of apparatus and applications. It is interesting to note that the decision tree monitor 78 is selecting examples of poor operation that may reflect its own poor operation and, then, the decision tree adaptation program 82 is adapting the decision tree monitor to overcome these examples of poor operation.

Figure 4:
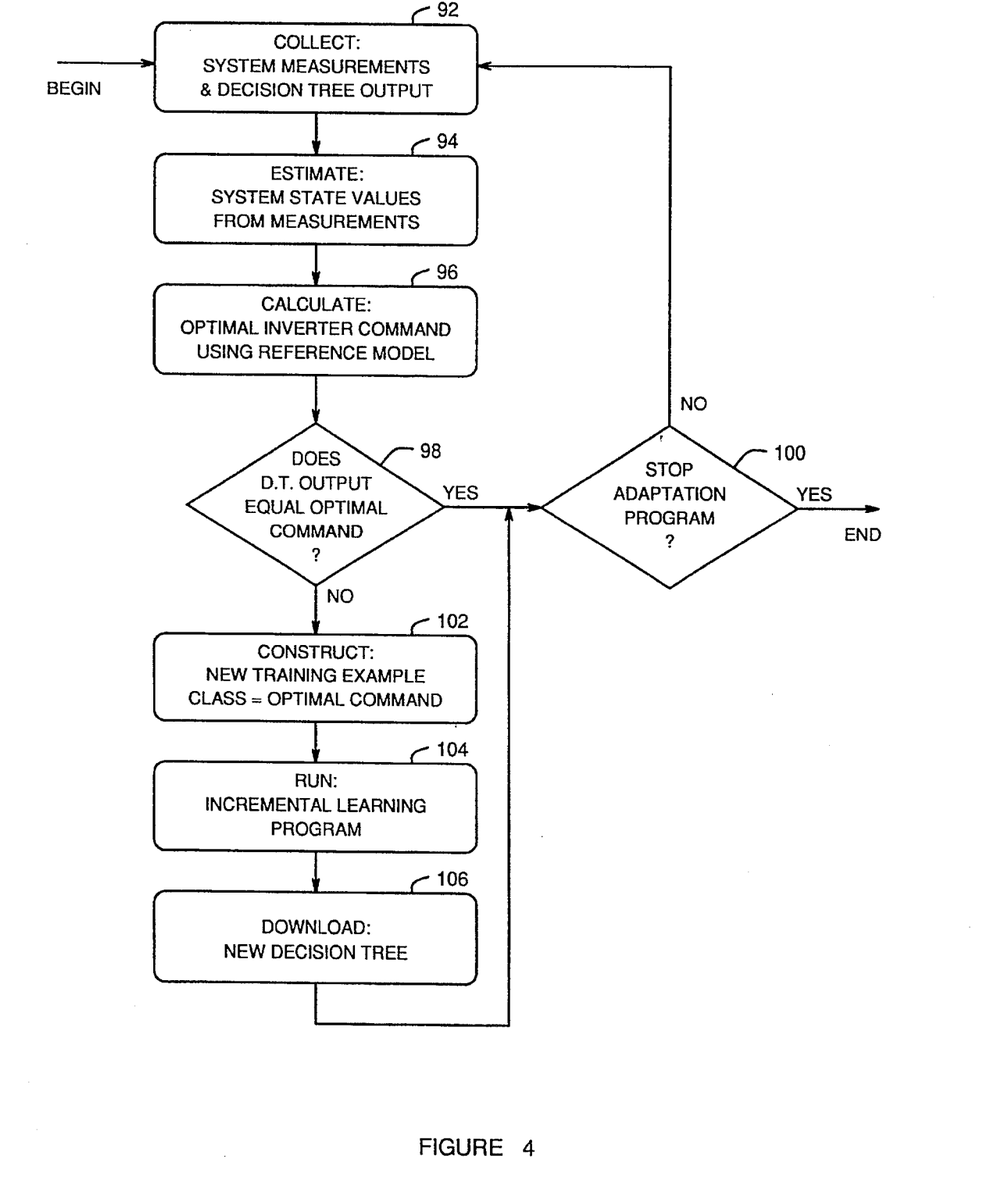
FIG. 4 is a block diagram illustrating one embodiment of adaptation of a decision tree.

Referring now to FIG. 4, there is shown a flow chart to help facilitate an understanding of the incremental adaptation method that has been described previously in detail. The incremental adaptation program begins at block 92 by collecting system measurements and decision tree output. For example, referring back to FIG. 2, the system measurements included motor speed, motor currents and error currents, and the decision tree output was a command that would place the induction motor drive 40 into one of seven distinct switching states. After the data have been collected, as indicated by block 94, the program estimates the system's state information values from the measurements. For example, motor flux may be estimated.

As indicated by block 96, the next step in the method is to calculate the optimal inverter command using a system reference model and an optimal modulator. At this step, an optimal command is determined and, at block 98, the optimal command is compared to the decision tree command. If the two commands are the same, the program proceeds to block 100 and either stops the adaptation program or returns to block 92 and begins again. If the decision tree command does not equal the optimal command, the program proceeds to block 102 and constructs a new training example using the optimal command as the class and also using the sensed attributes to complete the training example.

Using the new example or examples, an incremental learning program based on Utgoff's method, as described above, is performed to create a new tree based on the old tree (or old training set) and the new training examples. Once a new tree has been calculated, the new decision tree is downloaded and substituted for the currently active decision tree. Once the new decision tree becomes the currently active decision tree, the adaptation program either returns to the beginning or stops as indicated by block 100.

Figure 5:
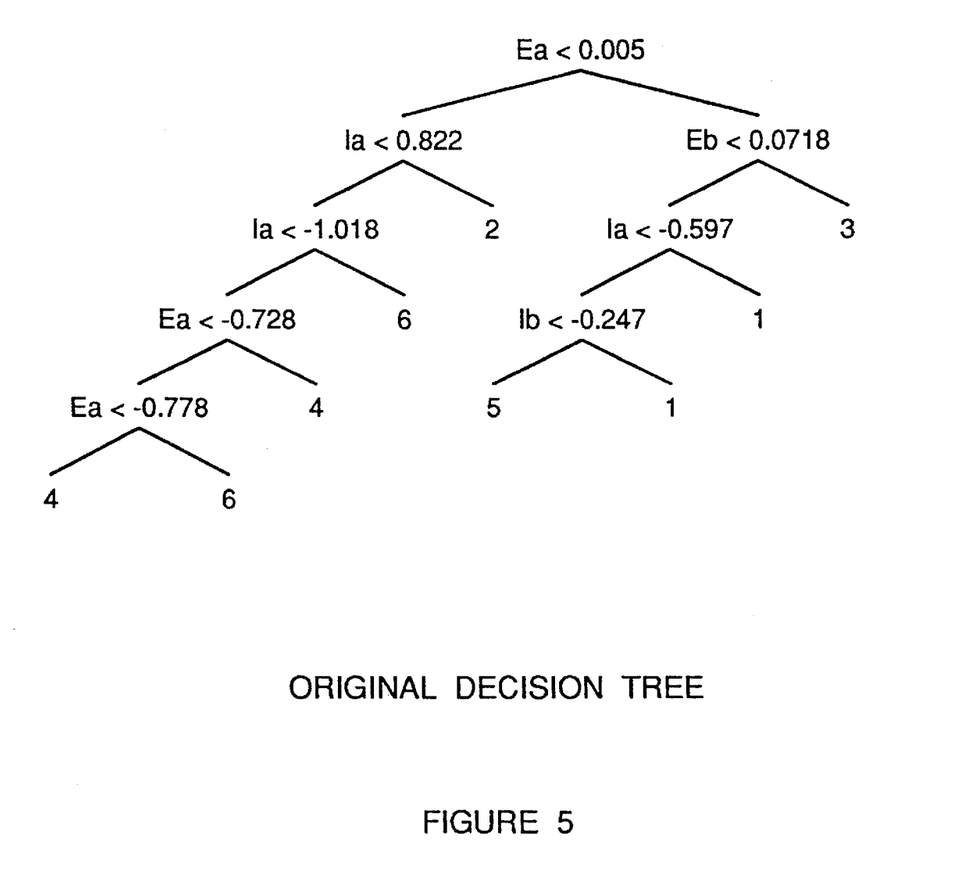
FIG. 5 is a simplified illustration of a hypothetical initial decision tree for controlling a motor.
Figure 6:
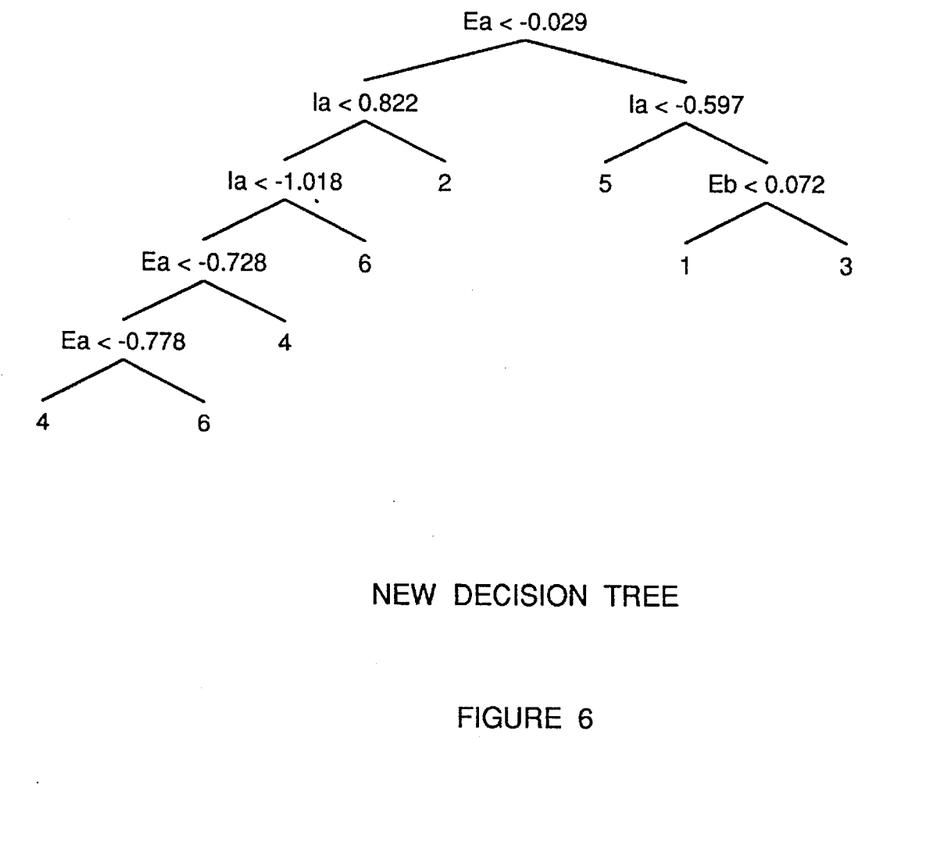
FIG. 6 is a simplified illustration of a hypothetical new decision tree that is produced by adapting the initial decision tree of FIG. 5.

Referring now to FIGS. 5 and 6, two highly simplified hypothetical examples of decision trees are shown. FIG. 5 represents an initial decision tree and FIG. 6 represents a new decision tree that was created from the tree of FIG. 5 using new training examples and one of the adaptation methods previously described. In the decision trees, $I_a$ is the motor current in phase A, $I_b$ is the motor current in phase B, $E_b$ is the error current associated with phase A, and $E_b$ is the error current associated with phase B in an inductive load such as a motor. It will be recalled that both adaptation methods operate to append new training examples and remove the same number of old training examples so that the number of training examples for that particular iteration remains below a constant limit. The size of the decision tree may fluctuate some, but it also will remain within a constant limit.

Figure 7:
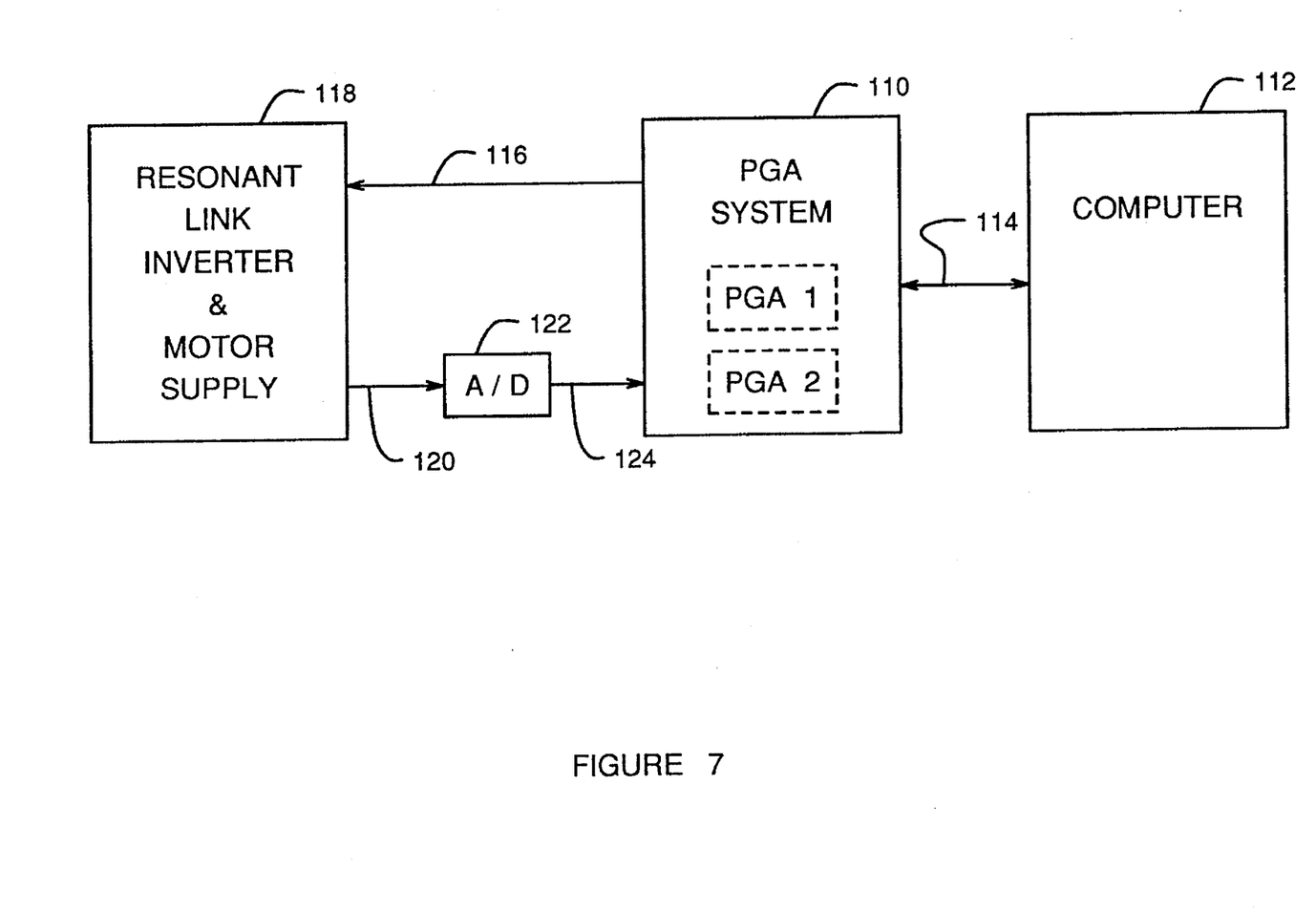
FIG. 7 illustrates preferred hardware for implementing decision trees in which the decision tree is located in a programmable gate array.

Referring to FIG. 7, a programmable gate array system 110 is illustrated as an apparatus for implementing the methods of the present invention. The programmable gate array system 110 communicates with a computer 112 through lines 114. The array 110 provides digital commands through lines 116 to a resonant link inverter and motor supply 118. Analog measurements are applied from the inverter and motor supply 118 through analog lines 120 to an analog to digital converter 122 whose output is applied through lines 124 to the programmable gate array system 110.

Preferably, the PGA system 110 includes at least two programmable gate arrays (or PAL's) such as the programmable gate array (or PAL) manufactured by Xilink which operates at a clock rate of 160 megahertz. Each of the PGA's of the system 110 are programmed with a decision tree that receives attribute values through lines 124 representing the operation of the resonant link converter and motor supply in the manner described, and preferably those attributes include the motor speed and at least two motor currents, each current being from a different phase. In response to these attributes, the decision tree within the PGA in the system 110 produces switching commands that are applied through lines 116 and control the resonant link converter and motor supply 118 in the manner previously described. The computer 112 communicates with the PGA system through lines 114, and the computer 112 monitors the operation of the currently active decision tree in one of the PGAs. The computer 112 identifies bad decisions made by the currently active decision tree, and it creates a new decision tree in accordance with the adaptation methods previously described. The new decision tree is loaded into the inactive PGA in the PGA system 110. Then, the inactive PGA with the new decision tree is switched into the system, and it becomes the currently active decision tree, and the previously active PGA is now inactive in terms of controlling the resonant link converter and motor supply 118.

The two PGA's shown in the PGA system 110 may actually contain the decision tree or the decision tree may be stored in memory connected with the PGA's. In the latter case the PGA's are programed with a decision tree evaluation program that evaluates the decision tree stored in memory to make decisions. When the decision tree is adapted or updated, the PGA's are switched to evaluate the new (adapted) tree in a new memory location.

In the previous apparatus examples, both the currently active decision tree and the inactive decision tree (the new decision tree) were implemented within computers which may or may not include multiple CPUs. The apparatus of FIG. 7 is intended to illustrate that other types of logic devices, other than computers, can be used to implement the methods of the present invention. The PGA system is a particularly advantageous system because the PGA is a relatively inexpensive device, and it can operate the decision tree at extremely fast switching rates considering the price of these devices. Since the computer 112 is operating at all times in an off-line environment, in most applications, the speed of computer 112 is not important. Thus, using the PGA system 110, which is relatively inexpensive, in combination with a relatively inexpensive computer, one obtains an efficient adaptive controller for a physical system, such as a resonant link inverter.

The rationale for using computer implementation of the adaptive decision tree system is flexibility and, therefore, computer implementation of the invention is most applicable to large processes, such as large motors, where the cost of the computer is not significant. The rationale for implementation in a less expensive logic device, such as a PGA, is low cost. Therefore, PGA implementation is best suited for applications including small or high volume processes, such as small motors or electric drives in electric or hybrid electric vehicles, or consumer appliances.

While several embodiments have been described above, it will be understood that the invention is not limited to these embodiments, and the invention is capable of numerous rearrangements, modifications and substitutions of parts without departing from the scope of the invention.

We claim:

1. A method for use in a control system, said method for monitoring and controlling a linear or non-linear physical system capable of operating in a plurality of physical system states, said physical system performing a function and producing sets of data that include information as to the performance of the function by the physical system, said control system including a monitor for receiving and monitoring the data of the physical system, a currently active decision tree for making decisions; and a controller for issuing commands for changing the operation of the physical system in accordance with the decisions, the method comprising:

a. collecting data and producing attributes and system state information;

b. using the attributes and system state information to evaluate the currently active decision tree to produce decisions.

c. applying the decisions in the controller to issue commands;

d. transmitting the commands to the physical system to control its operation;

e. repeating the aforementioned steps a–d to repetitively control the operation of the physical system;

f. while repeating steps a–d:

i. identifying decisions made by the currently active decision tree that were bad decisions based on an evaluation of the collected data;

ii. adapting a tree corresponding to the currently active decision tree based on the identified bad decisions to produce an adapted decision tree that has improved performance as compared to the currently active decision tree;

iii. maintaining the size of the adapted decision tree within a constant limit;

iv. using the adapted decision tree for the currently active decision tree to improve performance of the physical system; and       v. repeating the aforementioned steps i–iv to repetitively produce adapted decision trees that are successively used for the currently active decision tree while the size of each successive adapted decision tree is maintained within the constant limit, whereby the currently active decision tree is constantly updated to improve performance.

2. The method of claim 1 wherein said identifying step comprises:

providing a system reference model;

calculating optimal commands for the controller based on the collected data, attributes and system state information and the system reference model; and using the commands issued by the controller and the calculated optimal commands to identify bad decisions.

3. The method of claim 1 wherein said adapting step comprises:

adapting said decision tree using an incremental adaptation method that modifies portions of the decision tree while maintaining the size of the decision tree within a constant limit.

4. The method of claim 1 wherein said adapting step comprises:

adapting said decision tree using a regeneration method that modifies the decision tree while maintaining the size of the decision tree within a constant limit.

5. A method for use in a control system, said method for monitoring and controlling a linear or non-linear physical system capable of operating in a plurality of physical system states, said physical system performing a function and producing sets of data that include information as to the performance of the function by the physical system, said control system including a monitor for receiving and monitoring the data of the physical system, and a currently active decision tree for making decisions, said currently active decision tree being derived from a training set of attribute values and correct decisions, said control system further including a controller issuing commands for changing the operation of the physical system in accordance with the decisions, the method comprising:

a. collecting data and producing attributes and system state information;

b. using the attributes and system state information to evaluate the currently active decision tree to produce decisions;

c. applying the decisions in the controller to issue commands;

d. transmitting the commands to the physical system to control its operation;

e. repeating the aforementioned steps a–d to repetitively control the operation of the physical system;

f. while repeating the aforementioned steps a–d:

i. providing a system reference model and calculating optimal commands for controlling the physical system based on collected data, attributes and system state information;

ii. comparing the optimal commands to the commands that were actually issued based on the decisions made by the decision tree;

iii. identifying decisions made by the decision tree that were bad decisions based on the comparison of the optimal commands and the actually issued commands;

iv. for each bad decision, identifying corrected decisions based on the optimal command used in said comparing;

v. organizing the corrected decisions and attributes associated with the bad decisions into new examples for a training set;

vi. producing a new training set by adding the new examples to, and removing selected examples from, the training set so that the new training set is maintained at a size below a constant limit;

vii. adapting the currently active decision tree based on the new training set to produce an adapted decision tree that has improved performance as compared to the currently active decision tree and has a size that is maintained within a constant limit;

viii. using the adapted decision tree for the currently active decision tree to improve performance of the control system; and ix. repeating the aforementioned steps i–viii to repetitively produce adapted decision trees that are successively used for the currently active decision tree while the size of each successive adapted decision tree is maintained within a constant limit, whereby the currently active decision tree is successively updated to improve performance.

6. The method of claim 5 wherein the step of collecting and producing further comprises producing continuous valued attributes.

7. A method for use in a control system, said method for monitoring and controlling a non-linear physical system capable of operating in a plurality of system states, said physical system performing a function and producing data that include information as to the performance of the function by the physical system, said control system including a monitor for receiving and monitoring the data of the physical system;

the method comprising:

a. initially creating a currently active decision tree from examples that include attribute values and decisions, said decision tree including nodes that are associated with examples;

b. collecting data and producing attributes having values and system state information;

c. using the currently active decision tree and a controller to make decisions and issue commands for changing the operation of the physical system in accordance with the decisions;

d. repeating the aforementioned steps a–d to repetitively control the operation of the physical system;

e. while repeating the aforementioned steps a–c:

i. providing a system reference model and calculating optimal commands for controlling the physical system based on the data, attribute values and system state information;

ii. comparing the optimal commands to the commands that were actually issued based on the decisions made by the currently active decision tree;

iii. identifying decisions made by the currently active decision tree that were bad decisions based on the comparison of the optimal commands and the actually issued commands;

iv. for each bad decision, identifying corrected decisions based on the optimal command used in said comparing;

v. organizing the attribute values associated with each identified bad decision into a new example;

vi. including each new example in the examples;

vii. associating each new example with at least one node in the currently active decision tree;

viii. for each new example, identifying an old example for being removed from the examples;

ix. removing the identified old example from the examples and removing all of the associations of the identified old example, so that the steps of including new examples and removing identified old examples maintains the number of examples below a constant limit;

x. adapting the currently active decision tree by incremental adaptation based on the inclusion of new examples and removal of identified old examples to produce an adapted decision tree that has a size that is maintained within a constant limit;

xi. using the adapted decision tree for the currently active decision tree; and xii. repeating the aforementioned steps i–xi to repetitively produce adapted decision trees that are successively used for the currently active decision tree while the size of each successive adapted decision tree is maintained within a constant limit, whereby the currently active decision tree is constantly updated without growing the adapted decision tree.

8. A method for use in a control system, said method for monitoring and controlling a non-linear physical system capable of operating in a plurality of system states, said physical system performing a function and producing data that include information as to the performance of the function by the physical system, said control system including a monitor for receiving and monitoring the data of the physical system, the method comprising:

a. collecting data and producing continuous valued attributes having values and system state information;

b. using the currently active decision tree and a controller to make decisions and issue commands for changing the operation of the physical system in accordance with the decisions;

c. repeating the aforementioned steps a–b while:
  i. providing a system reference model and calculating optimal commands for controlling the physical system based on the data, continuous valued attribute values and system state information;
  ii. comparing the optimal commands to the commands that were actually issued based on the decisions made by the currently active decision tree;
  iii. identifying decisions made by the currently active decision tree that were bad decisions based on the comparison of the optimal commands and the actually issued commands;
  iv. for each bad decision, identifying corrected decisions based on the optimal command used in said comparing;
  v. organizing the attribute values associated with each identified bad decision into a new example;
  vi. including each new example in the examples and associating each new example with at least one node in the currently active decision tree;
  vii. adapting the currently active decision tree by incremental adaptation based on the inclusion of new examples to produce an adapted decision tree;
  viii. using the adapted decision tree for the currently active decision tree; and
  ix. repeating the aforementioned steps i–viii to repetitively produce adapted decision trees that are successively used for the currently active decision tree.

9. An improved method for use in a controller system, said method for monitoring and controlling a motor system having a motor capable of operating at a plurality of motor speeds, said motor system producing motor currents and motor current error signals, said motor performing a function and producing continuous valued data that include information as to the performance of the function by the physical system, said system including a monitor for receiving and monitoring the data of the physical system, the method comprising:

initially creating a currently active decision tree from examples that include continuous valued attribute values and decisions, said currently active decision tree including nodes that are associated with examples;

a. collecting data and producing continuous valued attributes and system state information;

b. using the currently active decision tree and a controller to make decisions and issue commands for changing the operation of the physical system in accordance with the decisions;

c. repeating the aforementioned steps a–b while:
  i. providing a system reference model and calculating optimal commands for controlling the motor system based on the data, attribute values and system state information;
  ii. comparing the optimal commands to the commands that were actually issued based on the decisions made by the currently active decision tree;
  iii. identifying decisions made by the currently active decision tree that were bad decisions based on the comparison of the optimal commands and the actually issued commands;
  iv. for each bad decision, identifying corrected decisions based On the optimal command used in said comparing;
  v. organizing the optimal decision and the attribute values associated with each bad decision into a new example in the format of the training set;
  vi. including each new example in the examples; and
  vii. associating each new example with at least one node in the currently active decision tree;
  viii. for each new example, identifying an old example for being removed from training set;
  ix. removing the identified old example from the examples so that the steps of including new examples and removing identified old examples maintains the number of examples below a constant limit;
  x. adapting the currently active decision tree by incremental adaptation based on the inclusion of new examples and the removal of identified old examples;
  xi. using the adapted decision tree for the currently active decision tree; and
  xii. repeating the aforementioned steps i–xi to repetitively produce adapted decision trees that are successively used for the currently active decision tree while the size of each successive adapted decision tree is maintained within a constant limit, whereby the currently active decision tree is constantly updated to improve performance without growing the adapted decision tree to a size that would impede its performance or exceed the capacity of the storage device in which the currently active decision tree is located.

10. A control system for monitoring and controlling a linear or non-linear physical system capable of operating in a plurality of physical system states, said physical system performing a function and repetitively producing data that include information as to the performance of the function by the physical system that may change over time, said control system comprising:

a monitor for receiving and monitoring the repetitively produced data of the physical system;

a currently active decision tree implemented in a device for repetitively making decisions based on the received data; and a controller for issuing commands for changing the operation of the physical system based on the decisions;

a processing system that operates, while the currently active decision tree and the controller issue commands to change the operation of the physical system, for:

a. collecting data from the monitor and produceing attribute values and system state information;

b. identifying decisions made by the currently active decision tree that were bad decisions based on an evaluation of the attribute values and system state information;

c. for each bad decision, identifying corrected decisions;

d. adapting the currently active decision tree based on the identified bad decisions and identified corrected decisions to produce an adapted decision tree that has improved performance as compared to the currently active decision tree, while maintaining the size of the adapted decision tree within a constant limit;

e. using the adapted decision tree for the currently active decision tree to improve performance of the controller system; and f. repeating the aforementioned functions a–e to repetitively produce adapted decision trees that are successively used for the currently active decision tree while the size of each successive adapted decision tree is maintained within a constant limit.

11. The control system of claim 10 wherein said device is a programmable gate array and said currently active decision tree is implemented by said programmable gate array.

12. The control system of claim 10 wherein said device comprises a programmable gate array for implementing a decision tree evaluation function and memory connected with said programmable gate array for storing at least one said decision tree.

13. The control system of claim 10 wherein:

said device comprises at least one programmable gate array and at least two decision trees are implemented by said device, one of which is the currently active decision tree; and said processing system is operable to switch and designate to another decision tree as the currently active decision tree.

14. The control system of claim 10 wherein said device comprises two programmable gate arrays and one decision tree is implemented by each said array.

15. A method for producing and incrementally adapting a decision tree comprising:

providing examples including attribute values and a decision;

initially creating a decision tree having at least one node and being consistent with the examples;

associating the examples and nodes of the decision tree;

providing a new example; and adapting the tree, at least in part, by including the new example in the examples and associating the new example with at least one node in the decision tree to produce an adapted tree.

16. The method of claim 15 wherein said attributes have continuous values.

17. The method of claim 15 further comprising:

identifying an example for being removed from the examples; and removing the identified example and the associations between the nodes and the identified example.

18. The method of claim 17 wherein said attributes have continuous values.

* * * * *